US012288662B2

(12) United States Patent
Düsberg et al.

(10) Patent No.: US 12,288,662 B2
(45) Date of Patent: Apr. 29, 2025

(54) X-RAY SOURCE AND TRANSMISSION WINDOW

(71) Applicant: KETEK GmbH Halbleiter-und Reinraumtechnik, Munich (DE)

(72) Inventors: Felix Düsberg, Munich (DE); Florian Schneider, Munich (DE); Michael Bachmann, Munich (DE); Andreas Pahlke, Brunnthal (DE)

(73) Assignee: KETEK GmbH Halbleiter-und Reinraumtechnik, Munich (DE)

( * ) Notice: Subject to any disclaimer, the term of this patent is extended or adjusted under 35 U.S.C. 154(b) by 225 days.

(21) Appl. No.: 17/821,641

(22) Filed: Aug. 23, 2022

(65) Prior Publication Data

US 2024/0071708 A1 Feb. 29, 2024

(51) Int. Cl.
*H01J 5/18* (2006.01)
*H01J 35/18* (2006.01)

(52) U.S. Cl.
CPC .............. *H01J 35/186* (2019.05); *H01J 5/18* (2013.01); *H01J 2235/083* (2013.01); *H01J 2235/084* (2013.01); *H01J 2235/183* (2013.01)

(58) Field of Classification Search
None
See application file for complete search history.

(56) References Cited

U.S. PATENT DOCUMENTS

| | | | | |
|---|---|---|---|---|
| 3,287,735 A * | 11/1966 | Day, Jr. | H04N 5/82 | 250/580 |
| 4,424,825 A * | 1/1984 | Hanson | F16K 51/02 | 251/188 |
| 7,035,378 B2 * | 4/2006 | Martinez | H01J 35/18 | 378/140 |
| 9,257,254 B2 | 2/2016 | Ogura et al. | | |
| 9,281,158 B2 * | 3/2016 | Ogura | H01J 35/12 | |
| 9,502,206 B2 * | 11/2016 | Harker | G21K 5/00 | |
| 9,589,760 B2 * | 3/2017 | Miyaoka | H01J 35/186 | |
| 10,229,808 B2 | 3/2019 | Ikarashi et al. | | |
| 10,418,222 B2 * | 9/2019 | Yamada | H01J 35/08 | |
| 10,658,146 B2 * | 5/2020 | Yamada | H01J 35/186 | |
| 11,817,288 B2 * | 11/2023 | Allaedini | H01J 35/18 | |
| 11,996,260 B2 * | 5/2024 | Allaedini | H01J 35/18 | |
| 2004/0125919 A1 * | 7/2004 | Martinez | H01J 35/18 | 378/140 |

(Continued)

FOREIGN PATENT DOCUMENTS

DE 102008014897 A1 * 10/2009 ............. H01J 35/08

OTHER PUBLICATIONS

Childres, I. et al., "Raman Spectroscopy of Graphene and Related Materials," Chapter 19, Jan. 1, 2013, 20 pages.

(Continued)

*Primary Examiner* — Thomas R Artman
(74) *Attorney, Agent, or Firm* — Slater Matsil, LLP

(57) ABSTRACT

In at least one embodiment an X-ray source includes an electron source configured to emit electrons, an acceleration set-up configured to accelerate the emitted electrons and a transmission window downwards of the acceleration set-up, the transmission window configured to let through X-rays generated by the accelerated electrons, wherein the transmission window incudes a carbon carrier, and wherein the carbon carrier includes sp2-hybridized carbon.

18 Claims, 2 Drawing Sheets

(56) References Cited

U.S. PATENT DOCUMENTS

| | | | | |
|---|---|---|---|---|
| 2014/0112450 | A1* | 4/2014 | Ogura | H01J 35/12 378/143 |
| 2014/0126701 | A1* | 5/2014 | Ogura | H05G 1/06 378/143 |
| 2014/0140487 | A1* | 5/2014 | Harker | G21K 1/00 378/161 |
| 2014/0369471 | A1* | 12/2014 | Ogura | H01J 35/116 378/143 |
| 2015/0103979 | A1* | 4/2015 | Miyaoka | H01J 35/186 378/140 |
| 2015/0303024 | A1* | 10/2015 | Harker | H01J 5/18 378/161 |
| 2016/0020061 | A1* | 1/2016 | Ikarashi | H01J 35/116 378/111 |
| 2019/0252150 | A1* | 8/2019 | Yamada | H01J 35/186 |
| 2019/0385808 | A1* | 12/2019 | Yamada | H01J 35/186 |
| 2020/0299833 | A1* | 9/2020 | Sipilä | C23C 16/345 |
| 2023/0082103 | A1* | 3/2023 | Allaedini | H01J 5/18 |
| 2024/0029990 | A1* | 1/2024 | Allaedini | H01J 35/18 |
| 2024/0071708 | A1* | 2/2024 | Düsberg | H01J 35/18 |
| 2024/0071709 | A1* | 2/2024 | Düsberg | H01J 35/06 |

OTHER PUBLICATIONS

Hodkiewicz, J. et al., “Characterizing Carbon Materials with Raman Spectroscopy,” Thermo Fisher Scientific, Madison, WI, USA, Application Note: 51901, 2010, 5 pages.

Panasonic, “PGS Graphite Sheets,” Type: EYG, Dec. 5, 2013, 7 pages.

* cited by examiner

X-RAY SOURCE AND TRANSMISSION WINDOW

TECHNICAL FIELD

An X-ray source is provided. A transmission window for such an X-ray source is also provided.

BACKGROUND

U.S. Pat. Nos. 9,257,254 B2 and U.S. Pat. No. 10,229,808 B2 refer to transmission targets.

Document "PGS" Graphite Sheets from Panasonic, Dec. 5, 2013, describes sheets of pyrolytic graphite.

Document Isaac Childres et al., "Raman Spectroscopy of Graphene and Related Materials", New developments in photon and materials research, 1, from 2013, refers to Raman spectroscopy of differently hybridized carbon.

SUMMARY

Embodiments provide an X-ray source for efficient emission of X-rays.

For example, the X-ray source device described herein comprises a transmission window having a carbon carrier of sp2-hybridzed carbon carrying a target layer. This allows a comparable low-energy transmission performance to beryllium, without the toxicity.

According to at least one embodiment, the X-ray source comprises one or a plurality of electron sources configured to emit electrons. The at least one electron source can be any one of a field emitter, a thermal emitter, a gate-insulator-substrate structure for emitting hot electrons and/or may work based on triboluminescence or Piezo effect. If there is a plurality of electron sources, as an option different types of electron sources can be combined with each other.

According to at least one embodiment, the X-ray source comprises one or a plurality of acceleration set-ups. The at least one acceleration set-up is configured to accelerate the electrons emitted by the at least one electron source. For example, the at least one acceleration set-up comprises at least two electrodes to accelerate the emitted electrons. It is further possible that the at least one acceleration set-up includes electron optics and/or at least one further electrode in order to define a path of the emitted electrons and/or of the already accelerated electrons. It is not necessary that all the electrons run along the same path.

According to at least one embodiment, the X-ray source comprises one or a plurality of transmission windows. The at least one transmission window is located downwards of the at least one acceleration set-up. The at least one transmission window is configured to be passed by X-rays generated by the accelerated electrons, for example, next to or at the at least one transmission window.

According to at least one embodiment, the at least one transmission window comprises one or a plurality of carbon carriers. The, for example, exactly one carbon carrier is that component of the transmission window that mechanically supports and carries the transmission window. In other words, without the carbon carrier the transmission window would be mechanically not stable in the intended use of the transmission window.

According to at least one embodiment, the carbon carrier comprises sp2-hybridized carbon. For example, most of the carbon of the carbon carries is present as sp2-hybridized. Thus, the carbon carrier has a high proportion of graphene-like bound carbon.

In at least one embodiment, the X-ray source comprises:
- an electron source configured to emit electrons,
- an acceleration set-up configured to accelerate the emitted electrons, and
- a transmission window downwards of the acceleration set-up and through which X-rays generated by the accelerated electrons are led,
- wherein the transmission window comprises a carbon carrier, and
- wherein the carbon carrier comprises sp2-hybridized carbon.

An important cost-factor of manufacturing X-ray tubes are the costs of a transmission window used. Usually, a beryllium window is used. Beryllium is suitable because it is an element with a low atomic mass, is electrically and thermally conductive and can be machined. For example, thicknesses of beryllium of about 125 μm are used. In addition, a metal layer at the beryllium window is used as a target layer, if necessary with an adhesion promoter, to generate the actual X-rays with characteristic X-ray energies suitable for the respective application. Due to the small thickness of the beryllium window, a high transmission in particular of a low-energy spectral component of the X-rays is possible. However, beryllium has the disadvantage that it is highly toxic and very expensive to produce.

In the X-ray source described herein, the beryllium window is replaced with graphitized carbon that has a high sp2 bond content. Depending on the production method, this allows mechanically stable and electrically as well as thermally conductive films to be realized as the carrier. Such films can also be used as a heat spreader in circuits because of its very high thermal conductivity and because such films are cheaper to obtain than beryllium. Further, such a solution for an X-ray transmission window avoids the health concerns and leads to significantly lower manufacturing costs. A higher tube power than with previous tubes based on beryllium windows is also conceivable due to the very high thermal conductivity of sp2-hybridized carbon.

Since different target metals are used in different applications and the best possible adhesion to the carbon carrier is required, various intermediate layers between the carbon carrier and a target layer may be necessary to realize this.

According to at least one embodiment, a mass proportion of carbon of the carbon carrier is at least 60% or is at least 85% or is at least 95% or is at least 99%. It is possible that the carbon carrier consists of carbon.

According to at least one embodiment, the carbon of the carbon carrier is predominantly sp2-hybridized. This means, for example, that in a deconvoluted Raman spectrum of the carbon carrier the 2D-peak has by at least a factor of 1.5 or by at least a factor of two or by at least a factor of five or by at least a factor of ten or by at least a factor of 50 a larger area content than the sp3-peak.

The D-peak, also referred to as G'-peak, is in the range between 2650 cm-1 and 2750 cm-1, for example, measured with laser excitation at 532 nm. For example, the sp3-peak, also referred to as defect peak, is located in a range between 1250 cm-1 and 1350 cm-1. Deconvolution of the Raman spectrum is done, for example, by one Gaussian fit per relevant peak.

The areas of the peaks, that is, the area content of the respective Gaussian curve fit, is a measure for the Raman intensity of the respective peak. The ratio of the intensities of the peaks roughly corresponds to a ratio of sp3 and sp2 bonds content in the carbon carrier.

According to at least one embodiment, the carbon carrier is of one or of a mixture of the following materials:

graphene, multi-layer graphene, bi-layer graphene, tri-layer graphene, exfoliated graphene, few-layer graphene, graphene-based material, graphene-family material, nano-crystalline graphene, pyrolytic graphene, pyrolytic carbon, graphitic carbon, graphenic carbon, glassy carbon, pyrolyzed polymer film, crystallized two-dimensional carbon, layered sheet of crystallized two-dimensional carbon, highly oriented pyrolytic graphite (HOPG), nature-graphite with hexagonal structure.

According to at least one embodiment, the carbon carrier comprises or consists of pyrolytic carbon.

The following values may apply at an atmospheric pressure of 1013 mbar and at a temperature of 300 K.

According to at least one embodiment, a thermal conductivity of the carbon carrier is at least 0.4 kW/(m·K) and/or is at most 3 kW/(m·K). Furthermore, it is possible that the thermal conductivity is inhomogeneous and has different values along different directions. For example, the thermal conductivities along at least two directions of the material differ from one another by at least a factor of 2 or by at least a factor of 5 or by at least a factor of 10 or by at least a factor of 30 or by at least a factor of 100.

Here and in the following, the different directions concerning the inhomogeneity can be two different directions within a plane of main extent of the carbon carrier; for example, an angle between said directions is 45° or is 60° or is 90°. Otherwise, the different directions concerning the inhomogeneity can refer to one direction within the plane of main extent and to a direction perpendicular to said plane, that is, to a first direction in the plane of the carbon carrier and to a second direction along a thickness direction of the carbon carrier, perpendicular to the first directions. Furthermore, the two directions can be aligned in any way possible in said plane.

According to at least one embodiment, a Young's modulus, also referred to as E modulus, of the carbon carrier is at least 2 GPa and/or is at most 200 GPa.

According to at least one embodiment, a density of the carbon carrier is at least 0.5 g/cm3 and/or is at most 2.5 g/cm3.

According to at least one embodiment, an electrical conductivity of the carbon carrier is at least 0.1 kS/m and/or is at most 1 MS/m. Furthermore, it is possible that the electrical conductivity is inhomogeneous and has different values along different directions. For example, the electrical conductivities along at least two directions of the material differ from one another by at least a factor of 2 or by at least a factor of 5 or by at least a factor of 10 or by at least a factor of 30 or by at least a factor of 100.

According to at least one embodiment, a tensile strength of the carbon carrier is at least 1 MPa and/or is at most 100 MPa. Furthermore, it is possible that the tensile strength is inhomogeneous and has different values along different directions. For example, the tensile strengths along at least two directions of the material differ from one another by at least a factor of 2 or by at least a factor of 5 or by at least a factor of 10 or by at least a factor of 30 or by at least a factor of 100.

According to at least one embodiment, the carbon carrier is capable of at least 103 and/or of at most 105 bending cycles. Per bending cycle, the carbon carrier is subject to a 180° bending.

According to at least one embodiment, the carbon carrier is capable of shielding electric or magnetic fields.

According to at least one embodiment, the carbon carrier is resistant to temperatures of at least 250° C. or of at least 450° C. or of at least 1000° C. or of at least 3000° C.

According to at least one embodiment, the carbon carrier is manufactured by one or by a plurality of the following methods:

- Chemical Vapor Deposition (CVD), like Atmospheric Pressure CVD (APCVD), Low-Pressure CVD (LPCVD), Plasma-Enhanced CVD (PECVD) or Ethanol-Catalytic CVD (ECCVD),
- Physical Vapor Deposition (PVD), like thermal deposition or electron-beam deposition or arc-PVD,
- transfer methods,
- catalytic deposition,
- solid phase graphenezation, like pyrolysis in combination with annealing.

According to at least one embodiment, the transmission window further comprises one or a plurality of target layers. The at least one target layer is carried by the at least one carbon carrier. However, alternatively it is also possible that the transmission window is free of any target layer, for example, free of any metallic layer configured for generating X-rays. In this case, the x-rays would be generated in the membrane itself.

According to at least one embodiment, the at least one target layer is located on a side of the carbon carrier facing the electron source.

According to at least one embodiment, the at least one target layer comprises or consists of one or of a plurality of metals. For example, the at least one target layer is of one of the following metals: Rh, W, Ag, Ti, Mo, Pt, Pd, Au. It is possible that there are target layers of different metals.

According to at least one embodiment, the at least one target layer is thinner than the at least one carbon carrier. For example, a thickness of the carbon carrier exceeds a thickness of the target layer by at least a factor of 1.5 or by at least a factor of 10 or by at least a factor of 50 and/or by at most a factor of 1000 or by at most a factor of 100.

According to at least one embodiment, the thickness of the target layer is at least 1 nm or is at least 10 nm or is at least 50 nm. Alternatively or additionally, said thickness is at most 5 μm or is at most 1 μm or is at most 0.2 m.

According to at least one embodiment, the thickness of the carbon carrier is at least 0.1 μm or is at least 1 μm or is at least 20 μm. Alternatively or additionally, said thickness is at most 2 mm or is at most 0.1 mm or is at most 40 μm.

Alternatively or additionally, said thickness is 5 μm and a thickness of the carbon carrier is between 0.02 mm and 2 mm.

According to at least one embodiment, the target layer is directly applied on the carbon carrier. For example, all of the face of the target layer facing the carbon carrier touches the carbon carrier.

According to at least one embodiment, the transmission window further comprises one or a plurality of bonding layers. The at least one bonding layer is located between the target layer and the carbon carrier. For example, the target layer and the carbon carrier are separated from one another by the respective bonding layer and are both in direct contact with the bonding layer, for example, with their complete faces facing the respective bonding layer.

According to at least one embodiment, the at least one bonding layer is of at least one inorganic material. For example, the at least one bonding layer or at least one of the bonding layers is a metallic layer and comprises or consists of one or of a plurality of metals selected from the following group: Cr, Ti, Au, Ni, Pt, Al. Alternatively or additionally, the at least one bonding layer or at least one of the bonding layers is a nitride layer and comprises or consists of one or of a plurality of the following materials: SiN, TiN. Alternatively or additionally, the at least one bonding layer or at least one of the bonding layers is a carbide layer and comprises or consists of one or of a plurality of the following materials: SiC, a carbide of the metal of the associated target layer. Alternatively or additionally, the at least one bonding layer or at least one of the bonding layers is a semiconductor layer and comprises or consists of one or of a plurality of the following materials: poly-Si, amorphous Si, crystalline Si.

According to at least one embodiment, a thickness of the at least one bonding layer is at least 1 nm or is at least 10 nm. Alternatively or additionally, said thickness is at most 1 μm or at most 0.1 μm or at most 20 nm.

According to at least one embodiment, a diameter of the carbon carrier and/or of the transmission window is at least 1 mm or is at least 4 mm or is at least 6 mm. Alternatively or additionally, said diameter is at most 10 cm or is at most 3 cm or at most 10 mm.

According to at least one embodiment, the X-ray source is free of any auxiliary structures supporting a central part of the transmission window, seen in top view. The central part is that part of the transmission window where a focal spot of the accelerated electrons is located, seen in top view of the transmission window. In other words, the transmission window and/or the X-ray source is free of supporting structures like bars or ridges located in the central part.

According to at least one embodiment, the focal spot of the accelerated electrons at the transmission window has a diameter of at least 0.1 mm or of at least 0.25 mm and/or of at most 4 mm. In this case, for example, the X-ray source is configured for X-ray fluorescence spectroscopy (XRF).

According to at least one embodiment, the focal spot of the accelerated electrons at the transmission window has a diameter of at least 2 mm or of at least 5 mm and/or of at most 20 mm. In this case, for example, the X-ray source is configured for ion mobility spectroscopy (IMS).

According to at least one embodiment, an area between the electron source and the transmission window is evacuated. This means, for example, that a pressure within the X-ray source, for example, after sufficient operation like a burn-in, and possibly directly at the transmission window is below 10-2 mbar or is below 10-4 mbar or is below 10-6 mbar or is below 10-8 mbar. Alternatively or additionally, said pressure is at least 10-9 mbar. These values apply, for example, at a temperature of the X-ray source of 300 K.

According to at least one embodiment, a side of the transmission window remote from the electron source is configured to be at a pressure of 1 bar at 300 K. That is, the X-ray source is configured to be operated with the transmission window at normal atmosphere, for example.

According to at least one embodiment, the transmission window is of plane-parallel fashion, overall or at least in the central part. Hence, at least across the central part the transmission window can be of constant thickness. It is possible that an edge part of the transmission window directly around the central part has a reduced or increased thickness in order to provide improved mounting of the transmission window. However, also all over the edge part the thickness of the transmission window can be constant. It is possible that the transmission window consists of the central part and of the edge part, seen in top view.

According to at least one embodiment, the X-ray source is configured for an operating power, for example of the electron source, of at least 10 mW or of at least 0.1 W. Alternatively or additionally, said operating power is at most 1 kW or is at most 0.1 kW.

According to at least one embodiment, an inner diameter and/or an outer diameter of the X-ray source is at least 1 mm or is at least 8 mm. Alternatively or additionally, said diameters are at most 10 cm or are at most 1 cm.

According to at least one embodiment, an inner length and/or an outer length of the X-ray source is at least 0.5 cm or is at least 2 cm. Alternatively or additionally, said lengths are at most 20 cm or are at most 4 cm.

According to at least one embodiment, the carbon carrier is optically non-transparent in the visible spectral range. For example, the carbon carrier has an absorption coefficient of at least 106 cm-1 or of at least 105 cm-1 or of at least 104 cm-1 or of at least 103 cm-1; this applies, for example, in the visible spectral range, like at a wavelength of 600 nm.

According to at least one embodiment, the X-ray source further comprises one or a plurality of window frames. The at least one window frame carries the corresponding at least one transmission window. The window frame can be a single piece or can be of multi-part fashion.

According to at least one embodiment, the at least one window frame is attached on the at least one acceleration set-up. That is, the at least one window frame can be mechanically carried and/or fixed by the at least one acceleration set-up.

According to at least one embodiment, the X-ray source is configured for one or a plurality of the following applications: XRF, IMS, X-ray diffraction (XRD), X-ray topography (XRT), X-ray crystallography (XRC), computer tomography (CT), radiography imaging, electron capture detection (ECD), medical. This may mean that an operating power, an emission spectrum, an emission angle range and/or an emission noise of the emitted X-rays fits the parameters required by the respective application.

A transmission window is additionally provided. The transmission window is configured for an X-ray source as indicated in connection with at least one of the above-stated embodiments. Features of the transmission window are therefore also disclosed for the X-ray source and vice versa.

In at least one embodiment, the transmission window is configured for an X-ray source and comprises:

- a carbon carrier that comprises sp2-hybridized carbon, and
- a target layer carried by the carbon carrier,
- wherein the target layer is of at least on metal and is thinner than the carbon carrier.

BRIEF DESCRIPTION OF THE DRAWINGS

An X-ray source and a transmission window described herein are explained in greater detail below by way of exemplary embodiments with reference to the drawings. Elements which are the same in the individual figures are indicated with the same reference numerals. The relationships between the elements are not shown to scale, however, but rather individual elements may be shown exaggeratedly large to assist in understanding.

DETAILED DESCRIPTION OF ILLUSTRATIVE EMBODIMENTS

Figure 1:
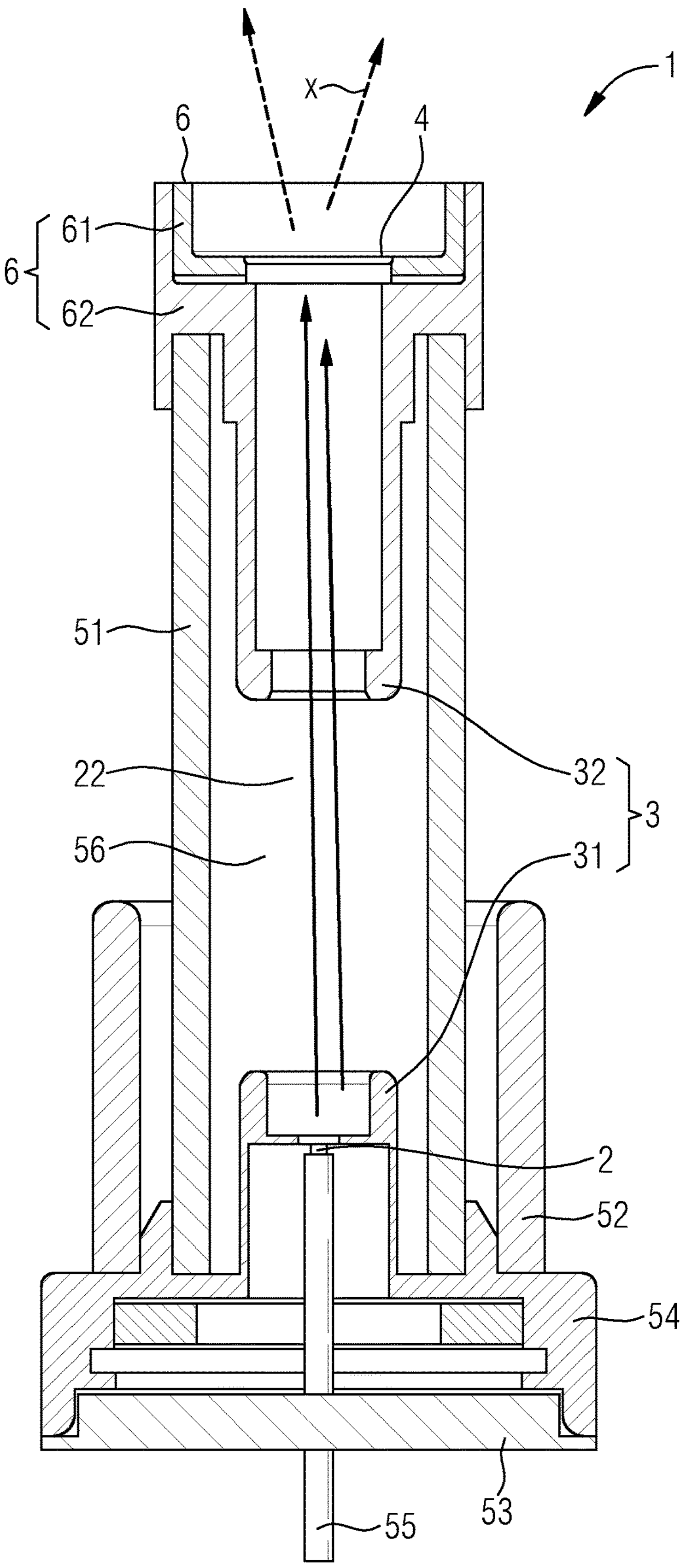
FIGS. 1 and 2 are schematic sectional views of exemplary embodiments of X-ray sources described herein.

FIG. 1 illustrates an exemplary embodiment of an X-ray source 1. The X-ray source 1 comprises a base plate 53 through which a pin 55 is led. The pin 55 carries an electron source 2 which is, for example, a filament that may be heated. The base plate 53 can be housed in a socket 54. Optionally, at the socket 54 there is an outer tube 52. It is possible that the socket 54 and the first electrode 31 are of one single piece.

The electron source 2 is configured to emit electrons 22. Downstream of the electron source 2, there is a first electrode 31 of an acceleration set-up 3. The first electrode 31 may be in one piece with the socket 54. Further, downstream of the first electrode 31 there is a second electrode 32 of the acceleration set-up 3. The acceleration set-up 3 is configured to accelerate the emitted electrons 22 along a direction away from the electron source 2, for example. Thus, the electrons 22 run through the second electrode 32 so that the latter can be a transmission anode.

A relative position between the electrodes 31, 32 is defined by an inner tube 51. Thus, the inner tube 51 may hold the second electrode 32.

For example, within the inner tube 51 into which the first electrode 31 and the pin 55 carrying the electron source 2 protrude, there is an evacuated area 56 maintaining a pressure in the sub-mbar range. The outer tube 52 may reach beyond the first electrode 31, starting from the socket 54, but may not reach up to the second electrode 31 that also protrudes into the inner tube 51 but from an opposite direction. The second electrode 32 may cover end faces of the inner tube 51 remote from the base plate 53.

Optionally, within an end portion of the second electrode 32 remote from the first electrode 31 there can be a window frame 6. The window frame 6 is configured to fix a transmission window 4 at an end of the inner tube 51. The window frame 6 may be a single piece, for example, like a half of a cylinder. Within the window frame 6, the transmission window 4 is arranged.

For example, the transmission window 4 is glued, sintered, brazed, soldered or welded onto the window frame 6. As an option, hard-soldering, brazing, soft-soldering eutectic soldering or glass soldering may be used as well as laser welding, electron beam welding, friction welding, ultrasonic welding, electric resistance welding or the like. It is possible that at an edge part the window frame 6 and/or the transmission window 4 carries a ring-like connection layer, not shown, for providing adhesion between these two components. Further, there can be a geometric structuring, not shown, at least one of the transmission window 4 and the window frame 6 for mounting the transmission window 4.

By means of the acceleration set-up 3, the electrons 22 are accelerated and optionally also focused onto the transmission window 4. Not shown, for focusing the electrons 22 there can be electron optics, realized, for example, by the shape of the electrodes 31, 32, like the shape of the second electrode 32. Upon impact of the electrons 22 onto the transmission window 4, X-rays are generated that are emitted by the X-ray source 1 through the transmission window 4. Thus, the X-ray source 1 may also be referred to as an X-ray tube.

The transmission window 4 is not based on beryllium, but is bases as its mechanically supporting component on sp2-hybridized carbon as explained in more detail below in connection with FIGS. 3 and 4.

For example, for x-ray fluorescence spectroscopy, the X-ray source 1 is configured for an operating power between 0.1 W and 15 W. Additionally, in ion mobility spectroscopy, operating powers down to 1 mW can be used. For example, an electron focal spot of the electrons 22 at the transmission window 4 has a diameter between 0.25 mm and 4 mm inclusive in case of serving for XRF, or may have a diameter between 5 mm and 20 mm inclusive in case of serving for IMS.

In FIG. 1, the X-ray source 1 is of linear design, that is, for example, the electrons 22 and the generated X-rays X are led along a common straight axis. Otherwise, it is also possible that the X-ray source 1 is of angled design so that the electrons 22 and/or the X-rays X may be led along a kinked axis having, for example, a 90° angle. Accordingly, not only transmission anodes but also solid anodes with an additional separate transmission window can be used. The same applies for all other examples of the X-ray source 1.

Figure 2:
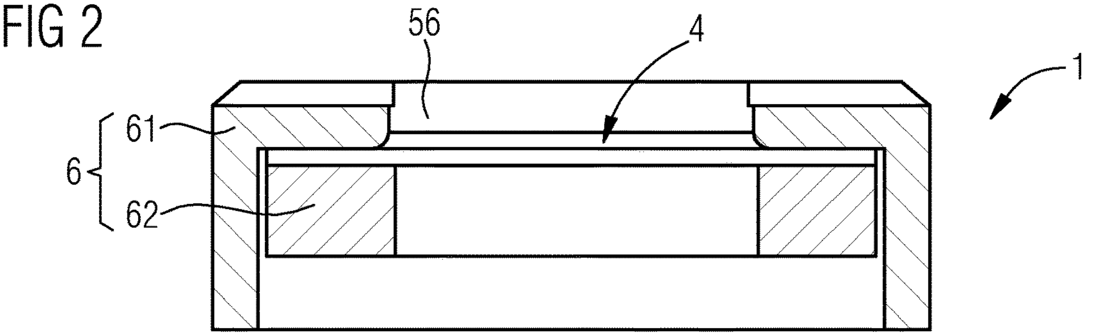

In the example of the X-ray source 1 of FIG. 2, the window frame 6 comprises an outer part 61 and an inner part 62. The transmission window 4 is placed between these two parts 61, 62 so that the edge part of the transmission window 4 is fixed in the window frame 6 and can adhesively be connected to both parts 61, 62. As in all other examples, it is possible that the transmission window 4 is of plane-parallel fashion.

Otherwise, the same as to FIG. 1 may also apply to FIG. 2, and vice versa.

Figure 3:
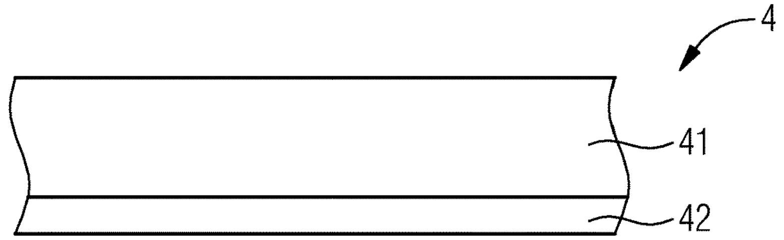
FIGS. 3 and 4 are schematic sectional views of exemplary embodiments of transmission windows for X-ray sources described herein.
Figure 4:
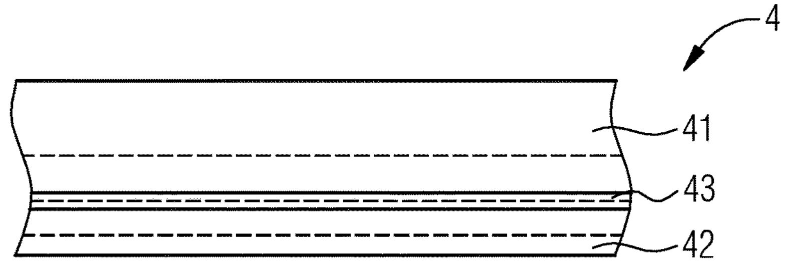

In FIGS. 3 and 4, examples of transmission windows 4 are illustrated. In each case, the transmission windows 4 comprise a carbon carrier 41 which is based on sp2-hybridized carbon and which mechanically carries the transmission windows 4. For example, a thickness of the carbon carrier 41 is between 0.02 mm and 0.1 mm inclusive. For example, a diameter of the carbon carrier 41 is between 5 mm and 9 mm inclusive. Optionally, the carbon carrier 41 is of pyrolytic carbon.

Optionally, the carbon carrier 41 carries a target layer 42. The target layer 42 is configured to generate the X-rays upon impact of the electrons 22. For example, the target layer 42 is of one of the following metals: W, Rh, Ag, Au, Mo, Pd. For example, a thickness of the target layer 42 is between 0.05 μm and 5 μm inclusive. The target layer 42 may be thinner than the carbon carrier 41 and may not be self-supporting so that the carbon carrier 41 is needed to mechanically support the target layer 42.

As shown in FIG. 3, the target layer 42 is directly applied onto the carbon carrier 41, for example, by sputtering or evaporating. Contrary to that, according to FIG. 4 there is a bonding layer 43 between the carbon carrier 41 and the target layer 42. The bonding layer 43 can be thinner than the target layer 42. For example, the bonding layer 43 is of an oxide, a nitride or of Si.

All the components 41, 42, 43 can be of single-layer fashion. However, as indicated in FIG. 4 by the dashed lines, one or a plurality of the carbon carrier 41, the target layer 42 and the optional bonding layer 43 can be of multi-layer fashion so that there is a plurality of sub-layers in the respective component. These sub-layers may differ from one another in material composition and/or in material configuration, like orientation or crystal lattice, and also in geometric properties, like thickness, lateral extend and/or shape. The same applies for all other examples.

Otherwise, the same as to FIGS. 1 and 2 may also apply to FIGS. 3 and 4, and vice versa.

Figure 5:
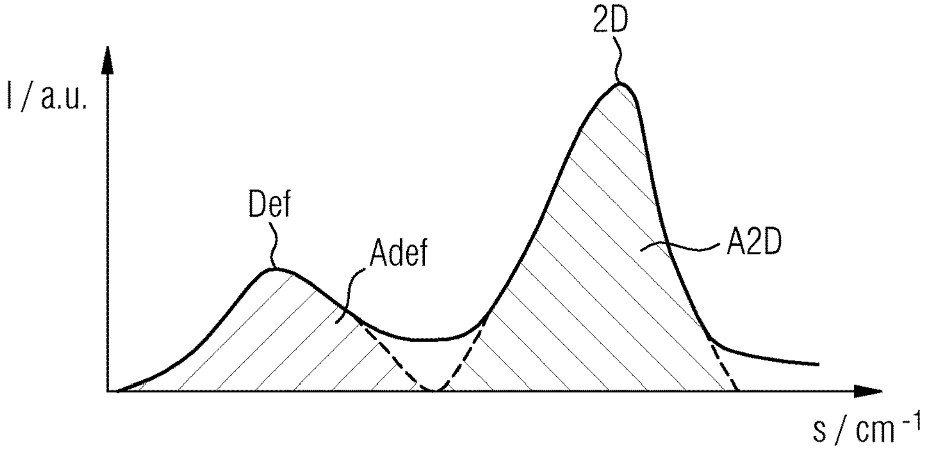
FIG. 5 is a schematic representation of the G-peak and the D-peak of exemplary embodiments of transmission windows for X-ray sources described herein.

In FIG. 5, a Raman shift S vs. a Raman Intensity I of a Raman spectrum of the carbon carrier 41 is schematically illustrated in the region of the 2D-peak and of the defect-peak, that is around 2700 cm-1 and around 1300 cm-1, respectively. The peaks are fitted by Gaussian curves so that an area content A2D of the 2D-peak and an area content Adef of the defect-peak are revealed. These area contents A2D, Adef are a measure of the proportions of sp2-hybridized carbon and sp3-hybridized carbon. As can be seen from the example in FIG. 5, the area content A2D is about a factor of three larger than the area content Adef, for example. Thus, the carbon carrier 41 is predominantly of sp2-hybridized carbon. This applies, for example, for laser excitation of the carbon carrier at 532 nm.

Concerning Raman spectroscopy of sp2-hybridized carbon, reference is also made to document Isaac Childres et al., "Raman spectroscopy of graphene and related materials", New developments in photon and materials research, 1, from 2013, as well as to Joe Hodkiewicz, "Characterizing Carbon Materials with Raman Spectroscopy", Thermo Fisher Scientific, Madison, WI, USA, Application Note: 51901; concerning the Raman spectroscopy, the disclosure content of these documents is incorporated by reference.

The invention described here is not restricted by the description on the basis of the exemplary embodiments. Rather, the invention encompasses any new feature and also any combination of features, which includes in particular any combination of features in the patent claims, even if this feature or this combination itself is not explicitly specified in the patent claims or exemplary embodiments.

What is claimed is:

1. An X-ray source comprising:

an electron source configured to emit electrons;

an acceleration set-up configured to accelerate the emitted electrons; and a transmission window downwards of the acceleration set-up, the transmission window configured to let through X-rays generated by the accelerated electrons, wherein the transmission window comprises:

a carbon carrier, a target layer carried by the carbon carrier, the target layer being located on a side of the carbon carrier facing the electron source, and a bonding layer located between the target layer and the carbon carrier, the bonding layer being of at least one inorganic material and comprising at least one of an oxide or a nitride, and wherein the carbon carrier comprises sp2-hybridized carbon.

2. The X-ray source of claim 1, wherein a mass proportion of carbon of the carbon carrier is at least 95%.

3. The X-ray source of claim 2, wherein the carbon carrier is of pyrolytic carbon.

4. The X-ray source of claim 1, wherein the target layer is of at least one metal and is thinner than the carbon carrier.

5. The X-ray source of claim 1, wherein a thickness of the target layer is at most 5 μm and a thickness of the carbon carrier is between 0.02 mm and 2 mm, inclusive.

6. The X-ray source of claim 1, wherein the target layer is of at least one of W, Rh, Ag, Au, Mo or Pd.

7. The X-ray source of claim 1, wherein a diameter of the carbon carrier is between 4 mm and 4 cm, inclusive, and wherein the X-ray source is free of any auxiliary structures supporting a central part of the transmission window, seen in top view, where a focal spot of the accelerated electrons is located.

8. The X-ray source of claim 1, wherein a focal spot of the accelerated electrons at the transmission window has a diameter of at least 0.1 mm and of at most 4 mm, and wherein the X-ray source is configured for X-ray fluorescence spectroscopy.

9. The X-ray source of claim 1, wherein a focal spot of the accelerated electrons at the transmission window has a diameter of at least 2 mm and of at most 20 mm, and wherein the X-ray source is configured for ion mobility spectroscopy.

10. The X-ray source of claim 1, wherein the X-ray source is an evacuated X-ray source between the electron source and the transmission window so that a pressure within the X-ray source is below $10^{-3}$ mbar at 300 K, and wherein a side of the transmission window remote from the electron source is configured to be at a pressure of 1 bar at 300 K.

11. The X-ray source of claim 1, wherein an electric conductivity of the carbon carrier is at least 0.1 kS/m.

12. The X-ray source of claim 1, wherein the electric conductivities of the carbon carrier in different directions differ from one another by at least a factor of 2.

13. The X-ray source of claim 1, wherein the carbon carrier is optically non-transparent in a visible spectral range and has an absorption coefficient of at least 104 $cm^{-1}$ at a wavelength of 600 nm.

14. The X-ray source of claim 1, further comprising:

a window frame, wherein the window frame carries the transmission window and is attached on the acceleration set-up.

15. A transmission window comprising:

a carbon carrier comprising sp2-hybridized carbon;

a target layer carried by the carbon carrier, the target layer being located on a side of the carbon carrier facing an electron source; and a bonding layer located between the target layer and the carbon carrier, the bonding layer being of at least one inorganic material and comprising at least one of an oxide or a nitride, wherein the target layer is of at least one metal and is thinner than the carbon carrier, and wherein the transmission window is configured for an X ray source.

16. An X-ray source comprising:

an electron source configured to emit electrons;

an acceleration set-up configured to accelerate the emitted electrons; and a transmission window downwards of the acceleration set-up, the transmission window configured to let through X-rays generated by the accelerated electrons, wherein the transmission window comprises a carbon carrier, wherein the carbon carrier consists of pyrolytic carbon so that the carbon of the carbon carrier is predominantly sp2-hybridized, wherein the carbon of the carbon carrier, in a deconvoluted Raman spectrum of the carbon carrier, has both a visible 2D-peak in a range between 2650 $cm^{-1}$ and 2750 $cm^{-1}$, inclusive and a visible sp3-peak in a range between 1250 $cm^{-1}$ and 1350 $cm^{-1}$, inclusive, and wherein the visible 2D-peak, when measured with laser excitation at 532 nm, has, by at least a factor of two, a larger area content than the visible sp3-peak.

17. The X-ray source of claim 16, wherein a thickness of the carbon carrier is between 0.02 mm and 2 mm, inclusive.

18. The X-ray source of claim 16, wherein a diameter of the carbon carrier is between 4 mm and 4 cm, inclusive, and wherein the X-ray source is free of any auxiliary structures supporting a central part of the transmission window, seen in top view, where a focal spot of the accelerated electrons is located.

* * * * *